US012569937B2

(12) United States Patent
Park et al.

(10) Patent No.: US 12,569,937 B2
(45) Date of Patent: Mar. 10, 2026

(54) THROUGH-GLASS VIA-HOLE FORMATION METHOD

(71) Applicants: JOONGWOO NARA CO., LTD., Ansan-si (KR); BSP CO., LTD., Anyang-si (KR)

(72) Inventors: Sung Soo Park, Yongin-si (KR); Hong Jin Park, Anyang-si (KR); Ju Ho Jang, Sejong-si (KR)

(73) Assignee: JOONGWOO M-TECH CO., LTD., Ansan-si (KR)

( * ) Notice: Subject to any disclaimer, the term of this patent is extended or adjusted under 35 U.S.C. 154(b) by 882 days.

(21) Appl. No.: 17/731,224

(22) Filed: Apr. 27, 2022

(65) Prior Publication Data

US 2023/0017356 A1     Jan. 19, 2023

(30) Foreign Application Priority Data

Jul. 13, 2021     (KR) ........................ 10-2021-0091757

(51) Int. Cl.
B23K 26/362 (2014.01)
B23K 26/40 (2014.01)
(Continued)

(52) U.S. Cl.
CPC ............ B23K 26/362 (2013.01); B23K 26/40 (2013.01); C03C 15/00 (2013.01);
(Continued)

(58) Field of Classification Search
CPC ............ B23K 2101/40; B23K 2103/54; B23K 26/0006; B23K 26/0622; B23K 26/362;
(Continued)

(56) References Cited

U.S. PATENT DOCUMENTS

| | | | | |
|---|---|---|---|---|
| 2014/0147624 A1* | 5/2014 | Streltsov | .............. | B23K 26/361 |
| | | | | 65/30.14 |
| 2020/0130105 A1* | 4/2020 | Isobe | .................... | B23K 26/362 |
| 2020/0254567 A1* | 8/2020 | Genier | .................. | H01L 21/268 |

FOREIGN PATENT DOCUMENTS

| | | |
|---|---|---|
| KR | 10-2013-0135873 A | 12/2013 |
| KR | 10-2205333 B1 | 1/2021 |

OTHER PUBLICATIONS

CAO (Year: 2019).*
Office Action of Korean Patent Application No. 10-2021-0091757 mailed Apr. 25, 2023.

* cited by examiner

*Primary Examiner* — Edward F Landrum
*Assistant Examiner* — Adam M Eckardt
(74) *Attorney, Agent, or Firm* — Revolution IP, PLLC

(57)     ABSTRACT

A through-glass via-hole formation method includes: forming a hole-shaped deformed region extending in a thickness direction of a glass substrate by irradiating the glass substrate with a laser beam at an energy intensity not exceeding an ablation threshold of the glass substrate; and forming a via-hole through the glass substrate along the deformed region by immersing the glass substrate in an etching solution such that the deformed region is etched and removed, wherein an etching solution having a first concentration is used as the etching solution to allow the via-hole to have a first aspect ratio, and an etching solution having a second concentration greater than the first concentration is used as the etching solution to allow the via-hole to have a second aspect ratio smaller than the first aspect ratio.

3 Claims, 4 Drawing Sheets

Deformed region formation step —S110

Via-hole formation step —S120

(51) Int. Cl.
*B23K 103/00* (2006.01)
*C03C 15/00* (2006.01)
*C03C 23/00* (2006.01)

(52) U.S. Cl.
CPC ...... *C03C 23/0025* (2013.01); *B23K 2103/54* (2018.08); *C03C 2203/50* (2013.01)

(58) Field of Classification Search
CPC ...... B23K 26/40; B23K 26/53; B23K 26/384; B23K 26/402; B23K 2103/50; B23K 26/0624; B23K 26/0738; B23K 26/382; B23K 26/386; B23K 26/389; B23K 26/55; B23K 26/38; B23K 26/57; C03C 15/00; C03C 2203/50; C03C 23/0025; C03C 23/00; C03C 15/02; G06F 16/2379; G06F 21/35; G06F 21/6245; G06F 2221/2113; G06F 9/54; G06F 21/41; H04L 2463/082; H04L 63/0853; H04L 63/105; G06Q 50/265; G06Q 50/26; C23C 22/00; C23C 22/74; C03B 33/082; C03B 33/0222; G02B 6/1225; G02B 6/136; H01L 21/486; H01L 23/15; H01L 23/49827; H05K 1/185; H05K 3/0047; H05K 3/429; H05K 3/4623; H05K 3/4697; H01F 1/16
See application file for complete search history.

Deformed region formation step — S110

Via-hole formation step — S120

(a)          (b)

(c)          (d)

(a)

(b)

(c)

(d)

(a)

(b)

(a)          (b)

(a)

(b)

(c)

THROUGH-GLASS VIA-HOLE FORMATION METHOD

FIELD

The present invention relates to a through-glass via-hole formation method and more particularly, to a through-glass via-hole formation method which can form micro via holes having a precise aspect ratio through a glass substrate.

BACKGROUND

A protective cover panel used in smartphones and the like is manufactured using a glass substrate. In order to provide a speaker hole, a button hole, and the like to the protective cover panel, it is necessary to form via holes through the glass substrate.

In order to form such through-glass via-holes, laser drilling through irradiation with a laser beam, chemical etching using photolithography, and the like are commonly used.

Laser drilling has drawbacks of: difficulty in forming clean via holes; variation in via hole shape depending on what type of laser source is used; and difficulty in precisely machining micro via holes having a diameter of 10 µm or less. In addition, since laser drilling is a time consuming process in which multiple via holes are machined one by one, the process cost increases in proportion to increase in number of via holes to be machined. Further, there is a problem of deterioration in durability of via holes due to cracks occurring during machining.

Chemical etching requires high-precision photolithography equipment depending on the sizes of via holes and has difficulty in achieving a precise aspect ratio due to difficulty in controlling via hole size since a via-hole has a larger diameter at an upper portion than at a lower portion due to a taper angle created during processing.

SUMMARY

Embodiments of the present invention are conceived to solve such problems in the art and it is an aspect of the present invention to provide a through-glass via-hole formation method which can form micro via holes having a precise aspect ratio through a glass substrate.

It will be understood that aspects of the present invention are not limited to the above. The above and other aspects of the present invention will become apparent to those skilled in the art from the detailed description of the following embodiments in conjunction with the accompanying drawings.

In accordance with one aspect of the present invention, there is provided a through-glass via-hole formation method including: forming a hole-shaped deformed region extending in a thickness direction of a glass substrate by irradiating the glass substrate with a laser beam at an energy intensity not exceeding an ablation threshold of the glass substrate; and forming a via-hole through the glass substrate along the deformed region by immersing the glass substrate in an etching solution such that the deformed region is etched and removed, wherein an etching solution having a first concentration is used as the etching solution to allow the via-hole to have a first aspect ratio, and an etching solution having a second concentration greater than the first concentration is used as the etching solution to allow the via-hole to have a second aspect ratio smaller than the first aspect ratio.

In one embodiment, the deformed region may have a cross-sectional area smaller than a cross-sectional area of the via-hole.

In one embodiment, a difference in etching velocity between the deformed region and a non-deformed region of the glass substrate not irradiated with the laser beam upon etching the glass substrate using the etching solution having the first concentration may be greater than a difference in etching velocity between the deformed region and the non-deformed region upon etching the glass substrate using the etching solution having the second concentration.

In one embodiment, the temperature of the etching solution having the first concentration may be reduced to allow the via-hole to have a greater aspect ratio than the first aspect ratio.

According to the embodiments of the invention, since a via-hole is formed through a glass substrate by forming a deformed region through phase transition of a portion of the glass substrate, which will be removed to form the via-hole, followed by removal of the deformed region by chemical etching, rather than by physical drilling of the glass substrate, the via-hole can have a clean circumferential surface while a thin glass substrate having a very smooth surface can be obtained.

In addition, according to the embodiments of the invention, since an etching solution having a first concentration is used to form a via-hole having an aspect ratio greater than or equal to a predetermined reference aspect ratio and an etching solution having a second concentration greater than the first concentration is used to form a via-hole having an aspect ratio less than the predetermined reference aspect ratio, it is possible to form micro via holes having a precise aspect ratio through the glass substrate.

It will be understood that advantageous effects of the present invention are not limited to the above and include any advantageous effects conceivable from the features disclosed in the detailed description of the present invention or the appended claims.

DRAWINGS

The above and other aspects, features, and advantages of the present invention will become apparent from the detailed description of the following embodiments in conjunction with the accompanying drawings.

Figure 7:
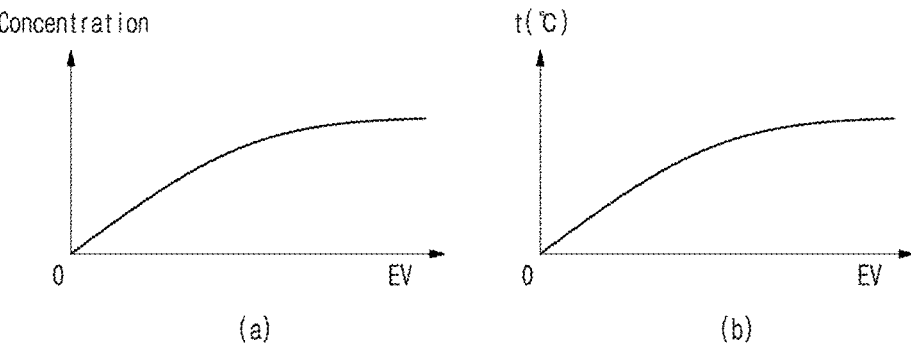
Figure 8:
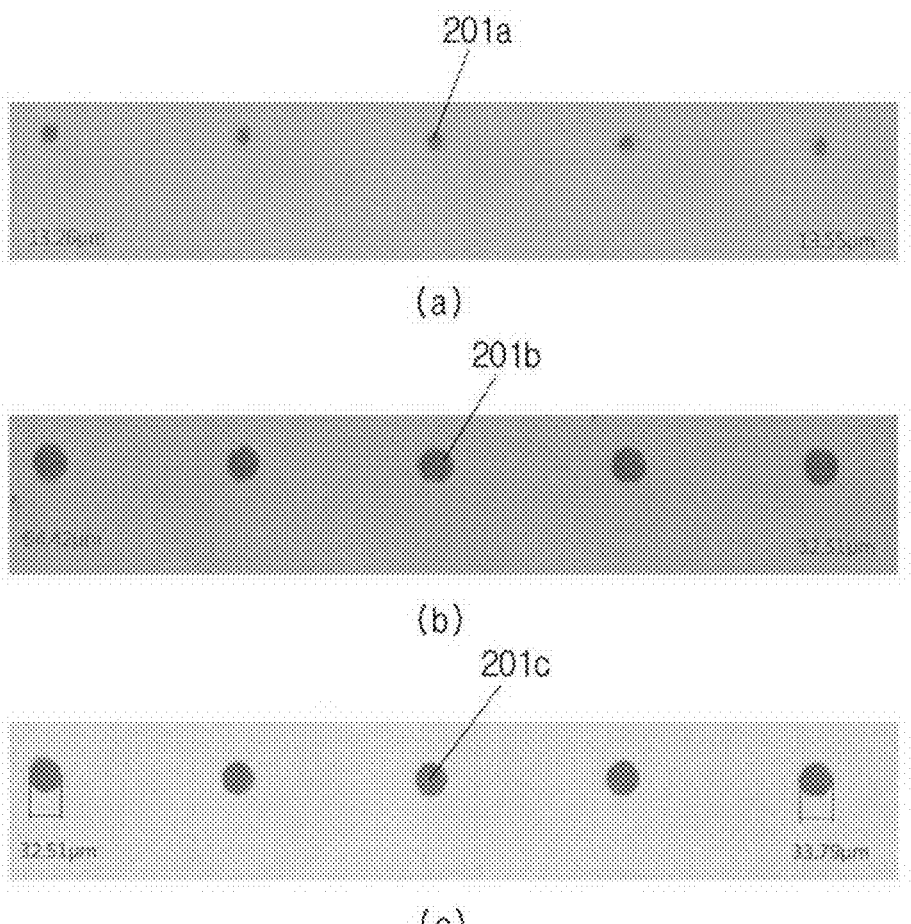

FIG. 7 shows graphs depicting relations between etching velocity and the concentration and temperature an etching solution in the through-glass via-hole formation method according to an embodiment of the present invention; and FIG. 8 is an image illustrating changes in via hole size depending on etching velocity and etching time in the through-glass via-hole formation method according to the embodiment.

DETAILED DESCRIPTION

Hereinafter, exemplary embodiments of the present invention will be described with reference to the accompanying drawings. It should be understood that the present invention may be embodied in different ways and is not limited to the following embodiments. In the drawings, portions irrelevant to the description will be omitted for clarity. Like components will be denoted by like reference numerals throughout the specification.

Throughout the specification, when an element or layer is referred to as being "on," "connected to," or "coupled to" another element or layer, it may be directly on, connected to, or coupled to the other element or layer or intervening elements or layers may be present. In addition, unless stated otherwise, the term "includes" should be interpreted as not excluding the presence of other components than those listed herein.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Figure 1:
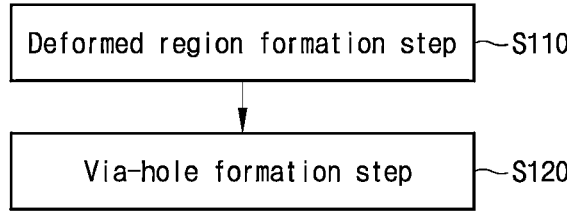
FIG. 1 is a flowchart of a through-glass via-hole formation method according to one embodiment of the present invention.
Figure 2:
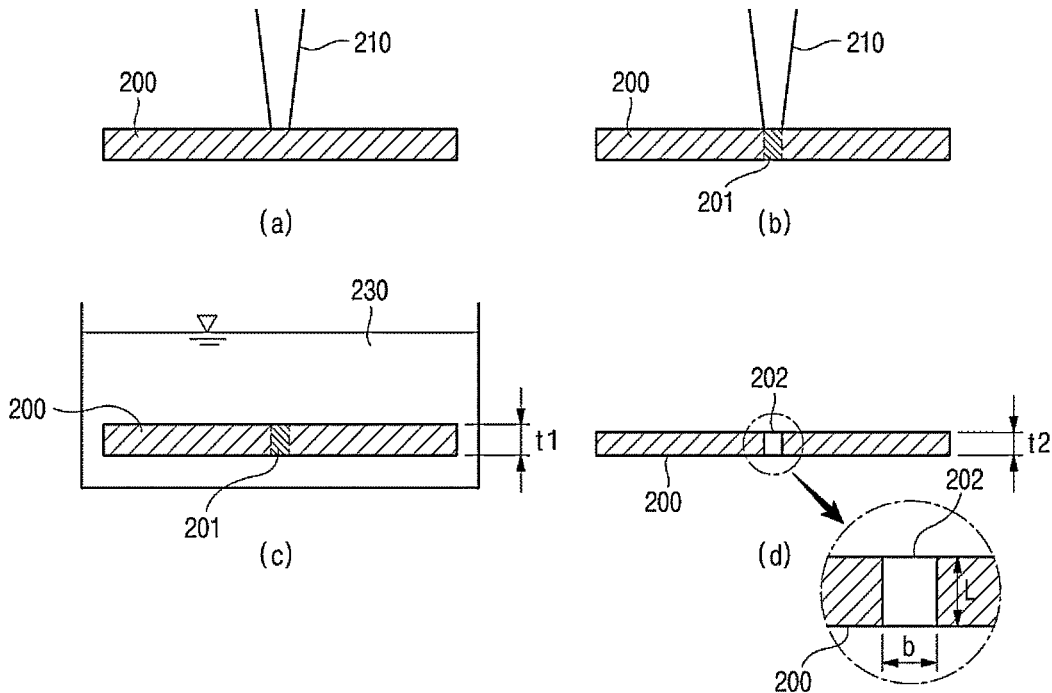
FIG. 2 is a schematic view illustrating a through-glass via-hole formation process according to one embodiment of the present invention.

FIG. 1 is a flowchart of a through-glass via-hole formation method according to one embodiment of the present invention and FIG. 2 is a schematic view illustrating a through-glass via-hole formation process according to one embodiment of the present invention.

Referring to FIG. 1 and FIG. 2, the through-glass via-hole formation method according to this embodiment may include a deformed region formation step S110 and a via-hole formation step S120.

In the deformed region formation step S110, a hole-shaped deformed region 201 extending in a thickness direction of a glass substrate 200 is formed inside the glass substrate 200 by irradiating the glass substrate 200 with a laser beam 210 at an energy intensity not exceeding an ablation threshold of the glass substrate 200.

Upon irradiating the glass substrate 200 with the laser beam 210, a region irradiated with the laser beam 210 may be deformed to form the deformed region 201. Specifically, the region irradiated with the laser beam L may undergo phase transition from an $\alpha$-phase to a $\beta$-phase.

In a region inside the glass substrate corresponding to the deformed region 201, permanent physicochemical structural deformation occurs by a nonlinear photoionization mechanism induced by the laser beam. A region in which the laser beam 210 is focused becomes rich in Si and dense and thus undergoes alteration in index of refraction. The deformed region 201 may be formed from an upper surface of the glass substrate 200 to a lower surface of the glass substrate 200, or may be formed in a middle region between the upper and lower surfaces of the glass substrate 200.

The deformed region 201 may be etched by an alkaline or acidic chemical solution 20 to 300 times faster than a non-deformed region of the glass substrate 200, that is, a region of the glass substrate 200 not irradiated with the laser beam. Here, the etching velocity of the deformed region may be adjusted by various parameters, such as laser intensity, pulse duration, repetition rate, wavelength, focal length, scan rate, and concentration of the chemical solution.

In one embodiment, the deformed region 201 may be formed by inducing phase transition of a region ranging from an upper surface of the glass substrate 200 to a lower surface of the glass substrate 200 through irradiation with the laser beam 210 with the depth of focus of the laser beam covering the entire thickness of the region ranging from the upper surface of the glass substrate 200 to the lower surface of the glass substrate 200. In another embodiment, the deformed region 201 may be formed by inducing phase transition of a region ranging from the upper surface of the glass substrate 200 to the lower surface of the glass substrate 200 through irradiation with the laser beam 210 while continuously moving the focus of the laser beam from the upper surface of the glass substrate 200 to the lower surface of the glass substrate 200.

In the via-hole formation step S120, a via-hole 202 is formed through the glass substrate 200 along the deformed region 201 by immersing the glass substrate 200 in an etching solution 230 such that the deformed region 201 is etched and removed.

The $\beta$-phase can react with a chemical etchant 100 or more times faster than the $\alpha$-phase. Accordingly, upon applying the etching solution 230 to the glass substrate 200, the deformed region 201 in the $\beta$-phase can be quickly etched and removed, whereby the via-hole 202 can be formed through the glass substrate 200 along the deformed region 201. Upon applying the etching solution 230 to the glass substrate 200, the non-deformed region can also be etched, although more slowly than the deformed region 201. Accordingly, a thickness t2 of the glass substrate 200 after the etching process may be smaller than a thickness t1 of the glass substrate 200 before the etching process.

According to the present invention, since the via-hole 202 is formed through the glass substrate 200 by forming a deformed region through phase transition of a region of the glass substrate 200, which will be removed to form the via-hole, followed by removal of the deformed region by chemical etching, rather than by physical drilling of the glass substrate 200, the via-hole 202 can have a clean circumferential surface while a thin glass substrate having a very smooth surface can be obtained.

In addition, according to the present invention, it is possible to eliminate the need to use a mask for formation of the deformed region 201 in the glass substrate 200.

Figure 3:
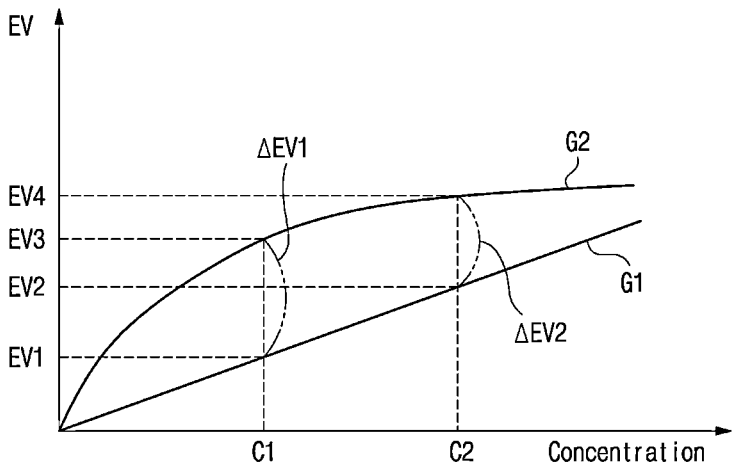
FIG. 3 is a graph illustrating the etching velocity of a deformed region of a glass substrate in the through-glass via-hole formation method according to the embodiment.

FIG. 3 is a graph illustrating the etching velocity of the deformed region of the glass substrate in the through-glass via-hole formation method according to the embodiment.

Referring to FIG. 3, as for relation between the concentration of the etching solution and etching velocity EV, the etching velocity of the non-deformed region of the glass substrate 200 increases linearly with increasing concentration of the etching solution (see graph 1 (G1)). Conversely, the etching velocity of the deformed region of the glass substrate 200 increases sharply as the concentration of the etching solution increases up to a certain value, and then increases slowly with further increasing concentration of the etching solution, as compared with graph 1 (G1) (see graph 2 (G2)).

Accordingly, a first etching velocity difference ΔEV1 between an etching velocity EV1 on graph 1 (G1) and an etching velocity EV3 on graph 2 (G2) at a first concentration C1 is greater than a second etching velocity difference ΔEV2 between an etching velocity EV2 on graph 1 (G1) and an etching velocity EV4 on graph 2 (G2) at a second concentration C2 greater than the first concentration C1. In other words, a difference in etching velocity between the deformed region and the non-deformed region, which is a region of the glass substrate not irradiated with the laser beam, when using an etching solution having the first concentration C1 is greater than a difference in etching velocity between the deformed region and the non-deformed region when using an etching solution having the second concentration C2. According to the present invention, based on such etching velocity characteristics, either a weak etching solution or a strong etching solution may be selectively used depending on the aspect ratio AR of a via-hole desired to be formed.

Referring to FIG. 2, the aspect ratio AR of a via-hole 202 may be expressed as a ratio of the length L of the via-hole 202 to the diameter b of the via-hole 202 (AR=L/b). A higher aspect ratio (AR) means that the via-hole 202 has a higher length-to-diameter ratio. That is, as the aspect ratio AR increases, the via-hole 202 becomes slimmer.

Figure 4:
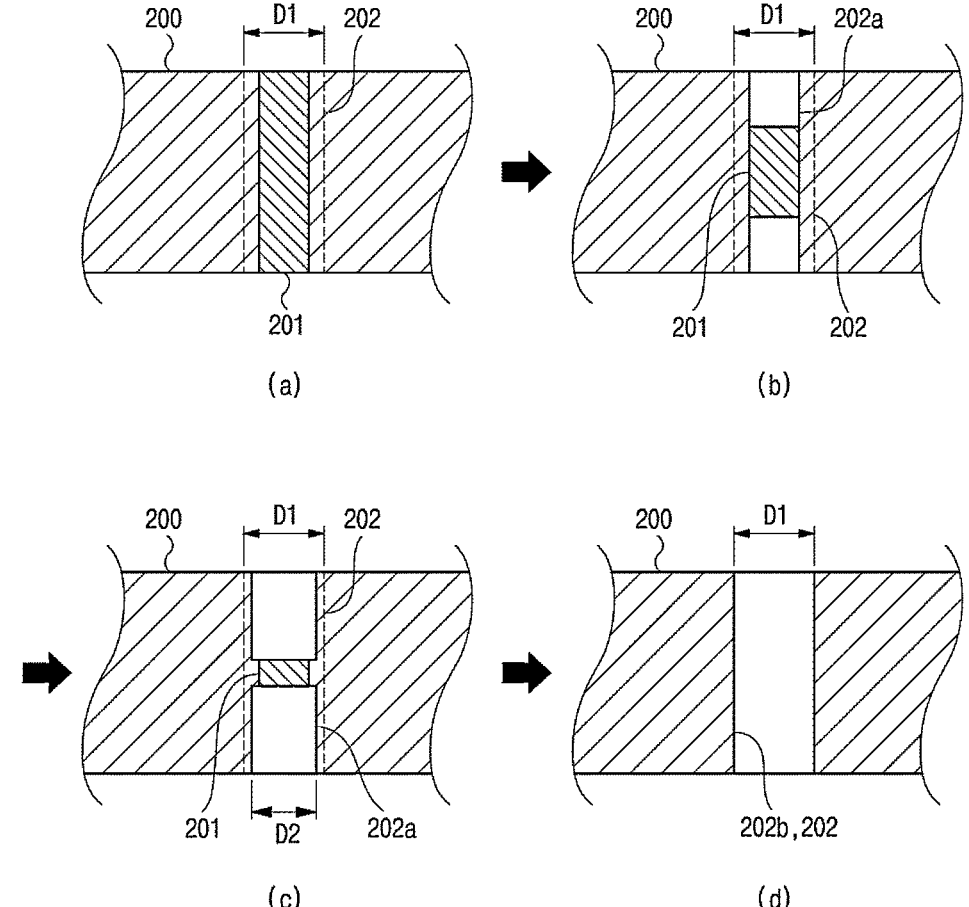
FIG. 4 is a sectional view illustrating a via-hole formation process by the through-glass via-hole formation method according to the embodiment.

FIG. 4 is a sectional view illustrating a via-hole formation process by the through-glass via-hole formation method according to the embodiment. In FIG. 4, it is assumed that a weak etching solution is used to form a via-hole having a high aspect ratio.

When a weak etching solution is used, a difference in etching velocity between the deformed region 201 and the non-deformed region is relatively large, as compared with when a strong etching solution is used. Accordingly, when the deformed region 201 has a smaller diameter than a via-hole 202 desired to be formed, it is possible to further increase the etching velocity of the deformed region 201 relative to the etching velocity of the non-deformed region. As a result, at an early stage of the etching process, etching in an axial direction of the deformed region 201 progresses quickly, whereas etching in a radial direction of the deformed region 201 progresses slowly, whereby holes 202a are formed starting from upper and lower ends of the deformed region 201, which the etching solution contacts first (see FIG. 4A and FIG. 4B).

As etching progresses, the holes 202a extend toward the center of the deformed region 201. At the same time, the holes 202a are gradually widened in the radial direction of the deformed region 201 as etching also progresses slowly in the radial direction of the deformed region 201. However, the diameter D2 of the holes 202a may still be smaller than the diameter D1 of the via-hole 202 desired to be formed (see FIG. 4(c)) until the etching process is completed.

Accordingly, the diameter of a via-hole 202b actually obtained after completion of etching may be the same as the diameter D1 of the via-hole 202 desired to be formed. In this way, it is possible to obtain a via-hole having a desired size.

As described above, the above example assumes that a relatively weak etching solution is used to form a via-hole having a high aspect ratio. Accordingly, a relatively strong etching solution may be appropriately used to form a via-hole having a low aspect ratio. In this way, it is possible to obtain a via-hole having a desired shape.

Figure 5:
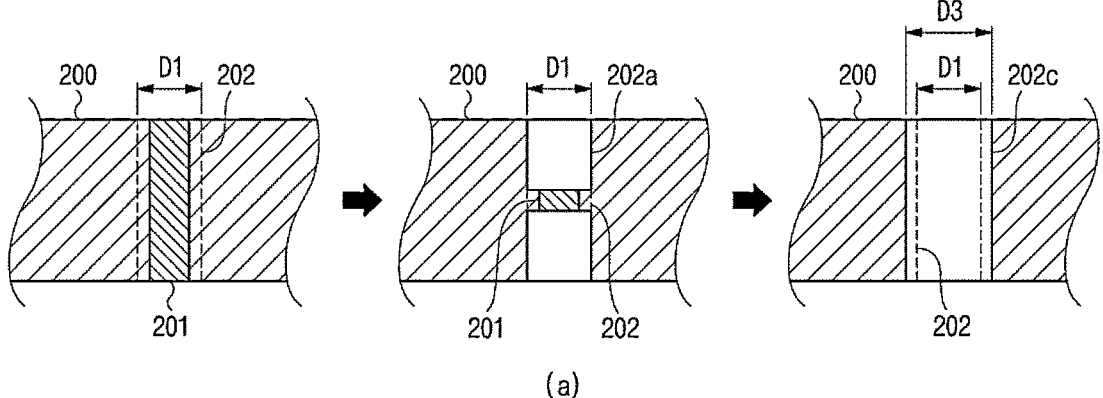
FIG. 5 is a sectional view illustrating a via-hole formation process depending on the concentration of an etching solution in the through-glass via-hole formation method according to the embodiment.
Figure 5:
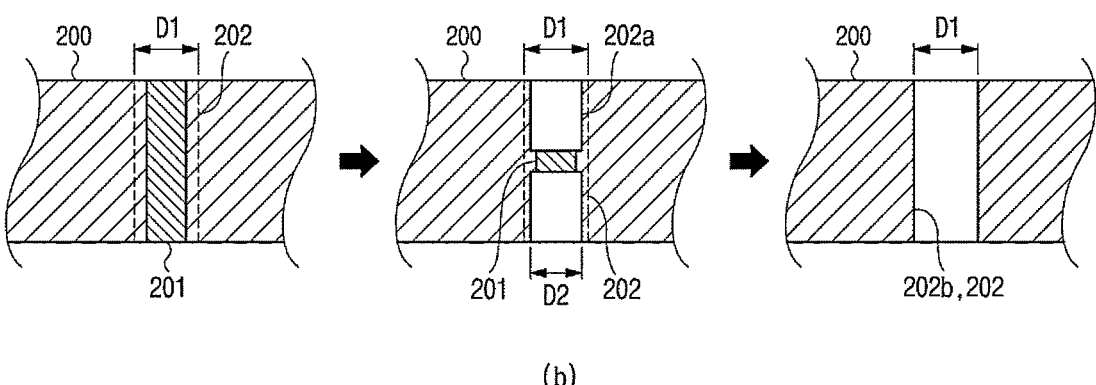

FIG. 5 is a sectional view illustrating a via-hole formation process depending on the concentration of an etching solution in the through-glass via-hole formation method according to the embodiment. In an example of FIG. 5, a via-hole having a high aspect ratio is formed for a given via hole diameter and a given glass substrate thickness.

When a relatively strong etching solution is used, the non-deformed region is etched relatively quickly during progress of etching of the deformed region 201, as compared with when a relatively weak etching solution is used, as shown in FIG. 5(a), due to a relatively small difference in etching velocity between the deformed region 201 and the non-deformed region.

Accordingly, even before etching in the axial direction of the deformed region 201 is completed, etching in the radial direction of the deformed region progresses to the degree that the diameter of a hole 202a formed by etching becomes the same as the diameter D1 of a via-hole 202 desired to be formed. Since etching in the radial direction of the deformed region 201 progresses further during further progress of etching in the axial direction of the deformed region 201, the diameter D3 of a via-hole 202c actually obtained after completion of etching exceeds the diameter D1 of the via-hole 202 desired to be formed, making it impossible to obtain a via-hole having a desired shape.

Conversely, when a relatively weak etching solution is used, the non-deformed region is etched relatively slowly during progress of etching of the deformed region 201, as compared with when a relatively strong etching solution is used, as shown in FIG. 5(b), due to a relatively large difference in etching velocity between the deformed region 201 and the non-deformed region.

Accordingly, until etching of the deformed region 201 is completed, the diameter D2 of a hole 202a formed by etching can be smaller than the diameter D1 of a via-hole 202 desired to be formed. Since etching in the radial direction of the deformed region 201 also progresses slowly during further progress of etching in the axial direction of the deformed region 201, the diameter of a via-hole 202b actually obtained after completion of etching can be the same as the diameter D1 of the via-hole 202 desired to be formed, making it possible to obtain a via-hole having a desired shape.

As described above, when a relatively weak etching solution is used, there is a large difference in etching velocity between the deformed region and the non-deformed region. Accordingly, in order to precisely form a via-hole having a high aspect ratio, an amount of the deformed region etched per unit time in the axial direction needs to be greater than an amount of the non-deformed region etched per unit time in the radial direction.

Since the difference in etching velocity between the deformed region and the non-deformed region is inversely proportional to the concentration of the etching solution, a via-hole 202 having a relatively high aspect ratio AR can be precisely formed using a relatively weak etching solution to increase the difference in etching velocity between the deformed region and the non-deformed region.

In addition, since the glass substrate 200 is etched in both the deformed region and the non-deformed region, it is desirable that a cross-sectional area of the deformed region be smaller than a cross-sectional area of a via-hole desired to be formed. In other words, it is desirable that the diameter of the deformed region be smaller than the diameter of a via-hole desired to be formed. The cross-sectional area of the deformed region may be appropriately determined in consideration of the cross-sectional area and aspect ratio AR of a via-hole desired to be formed and the desired post-etching thickness of the glass substrate.

Figure 6:
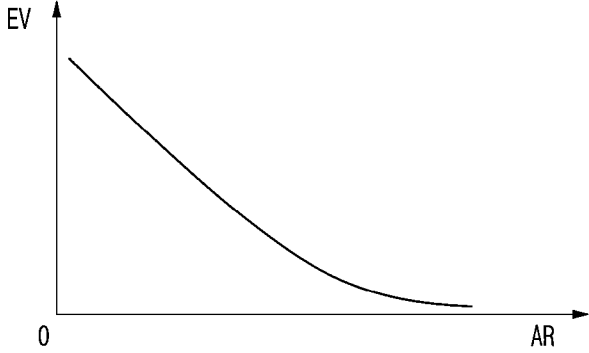
FIG. 6 is a graph depicting relation between etching velocity and aspect ratio in the through-glass via-hole formation method according to the embodiment.

FIG. 6 is a graph depicting relation between etching velocity and aspect ratio in the through-glass via-hole formation method according to the embodiment.

Referring to FIG. 6, it can be seen that a lower etching velocity EV, that is, a weaker etching solution, allows formation of a via-hole having a higher aspect ratio AR. This is because the non-deformed region of the glass substrate, such as the surface thereof, can be etched more uniformly and slowly than the deformed region of the glass substrate as the etching velocity EV decreases.

Conversely, a higher etching velocity EV, that is, a stronger etching solution, allows formation of a via-hole having a lower aspect ratio AR.

That is, assuming that an etching solution having a first concentration is used to form a via-hole 202 having a first aspect ratio, it is desirable that an etching solution having a second concentration greater than the first concentration be used to form a via-hole 202 having a second aspect ratio smaller than the first aspect ratio. Here, a reference aspect ratio, the first aspect ratio, the second aspect ratio, the first concentration, and the second concentration may be appropriately set in consideration of the type of material forming the glass substrate 200, the thickness of the glass substrate 200, and the diameter and length of a via-hole 202 desired to be formed. In this way, it is possible to precisely form a via-hole having a desired aspect ratio through the glass substrate.

As the etching solution, an etching solution containing at least one selected from among fluorine (HF), nitric acid (HNO$_3$), ammonium hydrogen fluoride (NH$_4$HF$_2$), and sulfuric acid (H$_2$SO$_4$) may be used.

FIG. 7 shows graphs depicting relations between etching velocity and the concentration and temperature the etching solution in the through-glass via-hole formation method according to an embodiment of the present invention.

Referring to FIG. 7, etching velocity EV can be increased by increasing the concentration or temperature of the etching solution. That is, when a fast etching velocity EV is required, use of a strong etching solution or increasing the temperature of the etching solution may be employed.

Conversely, etching velocity EV can be reduced by decreasing the concentration or temperature of the etching solution. In this way, it is possible to precisely form a via-hole having various aspect ratios.

In particular, for a given concentration of the etching solution, etching velocity EV may be adjusted by controlling the temperature of the etching solution. For a given concentration of the etching solution, increasing the temperature of the etching solution to reduce the etching velocity EV is advantageous for forming a fine via hole having a high aspect ratio AR.

FIG. 8 is an image illustrating changes in via hole size depending on etching velocity and etching time in the through-glass via-hole formation method according to the embodiment.

FIG. 8(*a*) shows via holes formed under the conditions of an etching time of 30 minutes, an etching velocity EV of 0.41 μm/min, and a post-etching glass substrate thickness of 684 μm, FIG. 8(*b*) shows via holes formed under the conditions of an etching time of 30 minutes, an etching velocity EV of 1.2 μm/min, and a post-etching glass substrate thickness of 633 μm, and FIG. 8(*c*) shows via holes formed under the conditions of an etching time of 90 minutes, an etching velocity EV of 0.43 μm/min, and a post-etching glass substrate thickness of 663 μm.

Referring to FIG. 8(*a*) and FIG. 8(*b*), it can be seen that, given the same amount of etching time (30 minutes) and similar post-etching glass substrate thicknesses (684 μm, 663 μm), a low etching velocity EV allows formation of fine via holes 201*a* having a size of 13.26 μm to 13.55 μm (see FIG. 8(*a*)). Conversely, a high etching velocity EV allows formation of relatively large via holes 201*b* having a size of 34.42 μm to 32.51 μm (see FIG. 8(*b*)).

Referring to FIG. 8(*a*) and FIG. 8(*c*), it can be seen that, given similar etching velocities (0.41 μm/min, 0.43 μm/min) and similar post-etching glass substrate thicknesses (684 μm, 663 μm), a relatively short etching time allows formation of fine via holes 201*a* having a size of 13.26 μm to 13.55 μm (see FIG. 8(*a*)). Conversely, a relatively long etching time allows formation of relatively large via holes 201*c* having a size of 32.51 μm to 33.79 μm (see FIG. 8(*c*)).

The through-glass via-hole formation method according to the present invention may be applied to manufacture of cellphone covers, interposers, microLED substrates, and the like.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention. For example, components described as implemented separately may also be implemented in combined form, and vice versa.

The scope of the present invention is indicated by the following claims and all changes or modifications derived from the meaning and scope of the claims and equivalents thereto should be construed as being within the scope of the present invention.

The invention claimed is:

1. A through-glass via-hole formation method, comprising:

forming a hole-shaped deformed region extending from an upper surface to a lower surface of a glass substrate by irradiating the glass substrate with a laser beam at an energy intensity not exceeding an ablation threshold of the glass substrate, thereby causing a permanent physicochemical structural deformation in the irradiated region such that the irradiated region is etched faster than a non-irradiated region;

immersing the glass substrate in a first etching solution having a first concentration to preferentially etch and remove the deformed region and open a via-hole through the glass substrate with a first aspect ratio; and subsequently immersing the glass substrate in a second etching solution having a second concentration greater than the first concentration to increase a diameter of the via-hole relative to its length and reduce the aspect ratio to a second aspect ratio smaller than the first aspect ratio, wherein a difference in etching velocity between the deformed region and the non-irradiated region when using the first etching solution is greater than a difference in etching velocity between the deformed region and the non-irradiated region when using the second etching solution, wherein the aspect ratio is defined as a ratio of a via-hole length to a via-hole diameter.

2. The through-glass via-hole formation method according to claim 1, wherein the deformed region has a cross-sectional area smaller than a cross-sectional area of the via-hole formed after the subsequently immersing step.

3. The through-glass via-hole formation method according to claim 1, wherein lowering a temperature of the first etching solution enables the via-hole to have a greater aspect ratio than the first aspect ratio.

\* \* \* \* \*